United States Patent

Collins et al.

[11] Patent Number: 5,289,987
[45] Date of Patent: * Mar. 1, 1994

[54] COMFORT MECHANISM FOR SAFETY BELT RETRACTOR ASSEMBLY

[75] Inventors: Cecil A. Collins, Shelby Township, Utica County; Timothy J. Schmidt, Troy, both of Mich.

[73] Assignee: General Safety Corporation, St. Clair Shores, Mich.

[*] Notice: The portion of the term of this patent subsequent to Jun. 16, 2009 has been disclaimed.

[21] Appl. No.: 880,165

[22] Filed: May 6, 1992

Related U.S. Application Data

[63] Continuation-in-part of Ser. No. 584,065, Sep. 18, 1990, Pat. No. 5,121,887.

[51] Int. Cl.$^5$ .............................................. B60R 22/34
[52] U.S. Cl. ................................. 242/107.6; 280/807
[58] Field of Search ......................... 242/107.6, 107.7; 280/803, 806, 807; 297/475-478

[56] References Cited

U.S. PATENT DOCUMENTS

| | | | |
|---|---|---|---|
| 4,002,311 | 1/1977 | Fisher et al. | 242/107.7 |
| 4,059,242 | 11/1977 | Tanaka | 242/107.7 X |
| 4,124,175 | 11/1978 | Cislak | 242/107.7 |
| 4,261,530 | 4/1981 | Asai et al. | 242/107.6 X |
| 4,856,728 | 8/1989 | Schmidt et al. | 242/107.7 |
| 5,121,887 | 6/1992 | Schmidt et al. | 242/107.6 |

Primary Examiner—John M. Jillions
Attorney, Agent, or Firm—Harness, Dickey & Pierce

[57] ABSTRACT

A safety belt retractor for providing motor vehicle occupant protection is disclosed. The retractor has a rotatable spool for storing safety belt webbing and a rewind spring for exerting a retraction force on the belt webbing. The retractor includes a comfort mechanism for relieving the tension exerted on the belt webbing by the rewind spring. The comfort mechanism is actuated in response to a deliberate motion exerted on the belt webbing which is different than belt movements normally associated with operation of the retractor. The tension relief feature can be automatically cancelled in response to the occurrence of a predetermined condition for returning the belt webbing to a taut position.

20 Claims, 9 Drawing Sheets

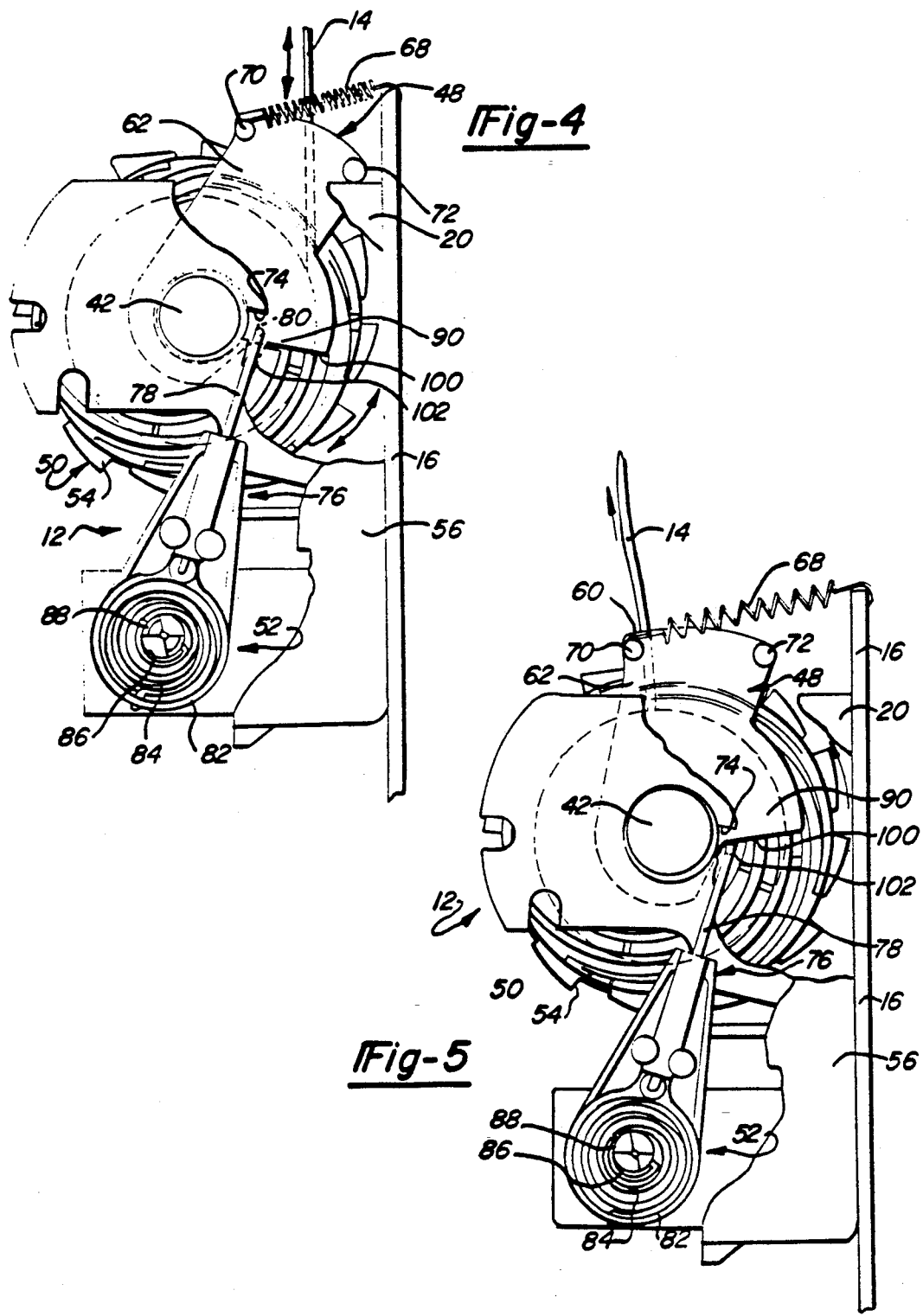

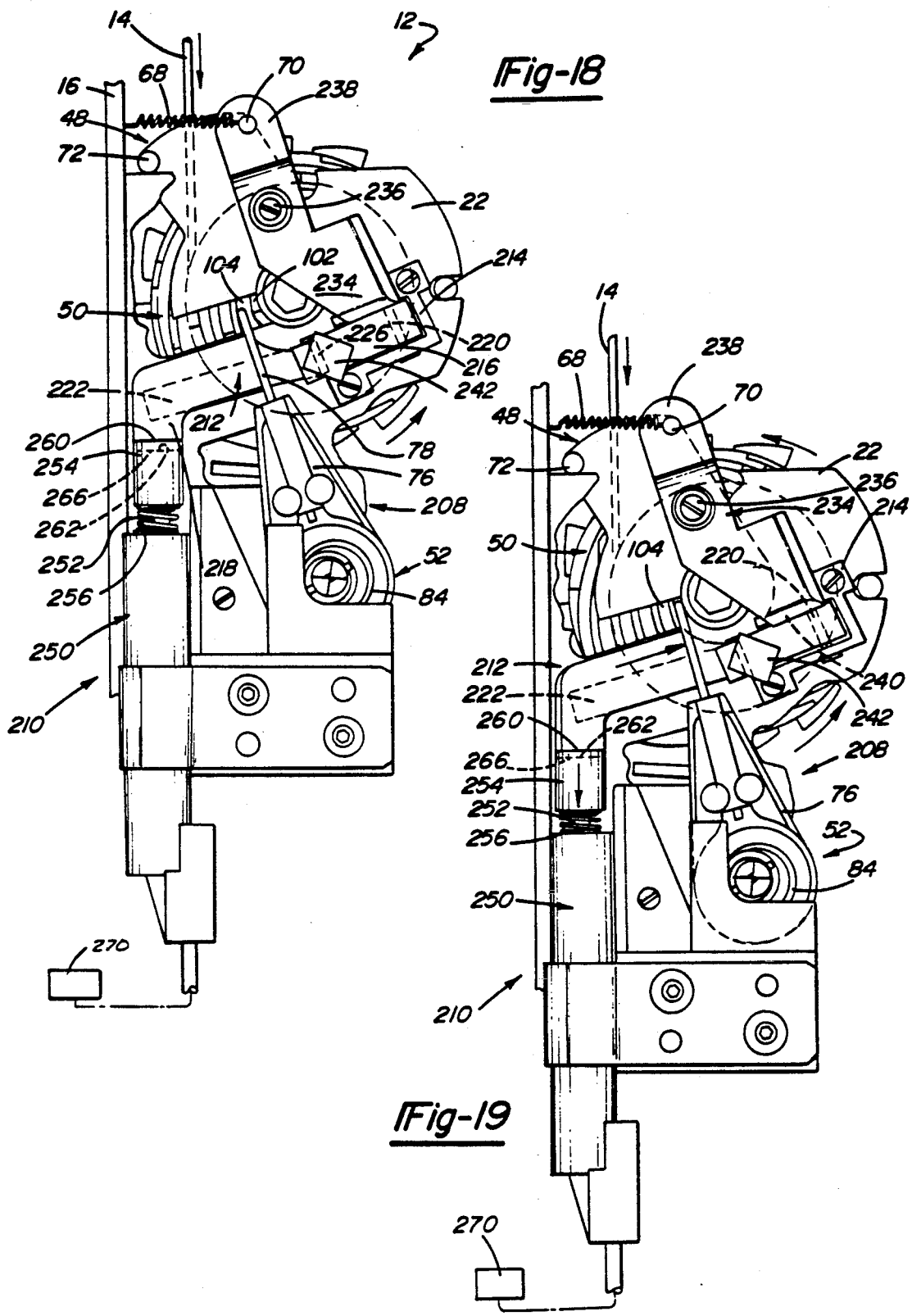

COMFORT MECHANISM FOR SAFETY BELT RETRACTOR ASSEMBLY

CROSS-REFERENCE TO RELATED APPLICATION

The present application is a continuation-in-part of U.S. Ser. No. 07/584,065 filed Sep. 18, 1990, now U.S. Pat. No. 5,121,887.

BACKGROUND AND SUMMARY OF THE INVENTION

The present invention relates generally to automotive safety belt retractor assemblies and, more particularly, to such a retractor assembly having an improved comfort mechanism and a method of operating and cancelling the same.

Virtually all motor vehicles are now equipped with safety belt restraint systems for physically restraining the seat occupants when the vehicle is subjected to a high rate of deceleration which may occur, for example, during a motor vehicle collision. Most safety belt restraint systems include one or more retractor assemblies which function to selectively permit and inhibit the withdrawal of belt webbing therefrom. In addition, some retractor assemblies also include one or more comfort features for providing the seat occupant with enhanced seating comfort. For example, an emergency locking retractor ("ELR") permits belt webbing to be controllably withdrawn from the retractor assembly during normal vehicle operating conditions for providing increased freedom of movement for the vehicle occupants. However, the "ELR" prevents the withdrawal of belt webbing from the retractor assembly when the vehicle is subjected to deceleration forces above a predetermined maximum level, thereby restraining the vehicle occupant.

As an additional comfort feature, some safety belt retractor assemblies are also equipped with a tension relieving device or so-called "comfort" mechanism. In general, comfort mechanisms are adapted to prevent the retractor assembly from exerting a retractive force on the belt webbing which tends to be uncomfortable and annoying to the seat occupants. Conventional comfort mechanisms are typically actuated in response to the magnitude and direction of belt movement for introducing a limited amount of "slack" to the belt webbing. Thereafter, the comfort mechanism can be "cancelled" for removing the "slack" by withdrawing a predetermined length of the belt webbing from the retractor assembly. Upon cancellation of the slack, the retractor assembly exerts the retractive force on the belt webbing for returning it to a "taut" position against the seat occupant. Moreover, governmental regulations now require that the tension relief feature of any comfort mechanism be automatically cancelled in response to the occurrence of specific conditions such as, for example, opening of the vehicle door.

Accordingly, the present invention is directed to an improved comfort mechanism for use in safety belt retractor assemblies. Actuation of the comfort mechanism for setting the desired amount of belt "slack" requires a conscious "intentional" and "deliberate" act on the part of the seat occupant. As such, the safety belt retractor assembly of the present invention will not provide tension relief until the comfort mechanism is deliberately actuated by an intentional act of the vehicle occupant. As a related object, the present invention is directed to a method for actuating and cancelling the tension relief feature of the improved comfort mechanism.

A further object of the present invention is to provide means for automatically cancelling the tension relief feature of the improved comfort mechanism in response to the occurrence of a predetermined condition. To this end, the comfort mechanism of the present invention includes a solenoid-actuated release mechanism operable for automatically cancelling the tension relief in response to an electrical signal indicative of the predetermined condition.

The improved comfort mechanism of the present invention includes a locking member, a driven member and a movable actuation member located intermediate to the locking member and the driven member. With the comfort mechanism in a "non-actuated" mode, the locking member is disengaged from the driven member for prohibiting tension relief (i.e., "slack") in the safety belt. When it is desired to place the comfort mechanism in its "acutated" mode, the safety belt is extracted from the retractor assembly to its fully extended position. Thereafter, the seat occupant must intentionally and deliberately "tug" or "snap" the safety belt for causing the actuation member to move to a position wherein the locking member is permitted to engage the driven member for providing the desired tension relief. A release mechanism is provided for returning the comfort mechanism to its "non-actuated" mode for automatically cancelling the tension relief feature under certain specific conditions.

Additional benefits and advantages of the present invention will become apparent to those skilled in the art from studying the written description and the appended claims, taken in conjunction with the accompanying drawings.

BRIEF DESCRIPTION OF THE DRAWINGS

FIGS. 4 through 7 are partially cut-away side views of FIG. 2 showing the improved comfort mechanism in various modes of operation, wherein FIG. 4 illustrates the comfort mechanism operating in a "non-actuated" mode, FIG. 5 illustrates a method of deliberately "actuating" the comfort mechanism, and FIGS. 6 and 7 show a method for manually setting and cancelling the tension relief when the comfort mechanism is in an "actuated" mode;

FIG. 16 is a view, similar to FIG. 14, showing a method for deliberately actuating the comfort mechanism;

FIG. 18 is a view, similar to FIG. 14, showing a method for manually setting the tension relief once the comfort mechanism is in the "actuated" mode; and FIG. 19 is a view, similar to FIG. 18, illustrating a method and apparatus for automatically cancelling the tension relief feature and returning the comfort mechanism to its "non-actuated" mode.

DETAILED DESCRIPTION OF THE INVENTION

Figure 1:
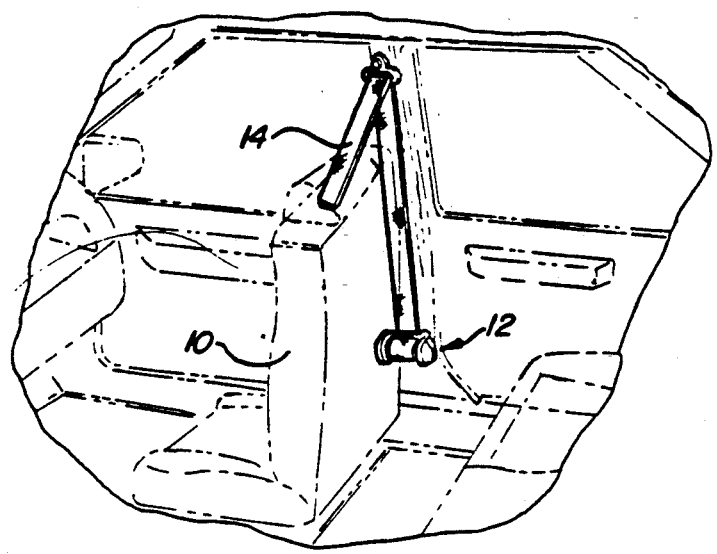
FIG. 1 is a partial interior view of a motor vehicle showing an exemplary seating arrangement and a safety belt restraint system.

Referring to FIG. 1, a portion of the interior of an exemplary motor vehicle is shown to include a seat 10 and a retractor assembly, generally indicated at 12, mounted on a vertical pillar on the interior of the motor vehicle in a conventional manner. A safety belt webbing 14 projects from retractor assembly 12 and is adapted to extend over the shoulder and across the chest of the vehicle occupant for fastening to a seat belt buckle. As will be appreciated, the safety belt restraint system and seating arrangement shown in FIG. 1 is merely exemplary of the environment in which the present invention is particularly well-suited for use.

Figure 2:
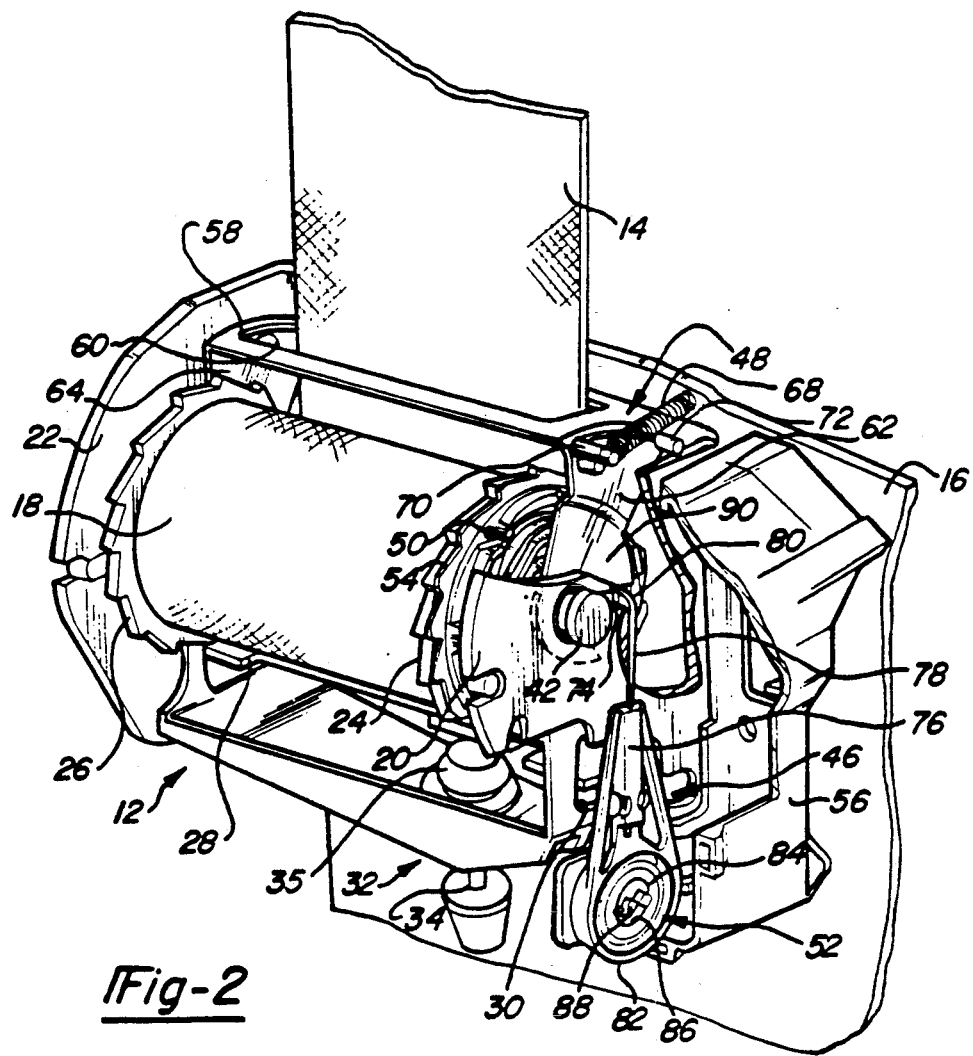
FIG. 2 is a partially cut-away pictorial view of an exemplary retractor assembly for use with the safety belt restraint system shown in FIG. 1 and which is equipped with an improved comfort mechanism constructed according to a preferred embodiment of the present invention.
Figure 3:
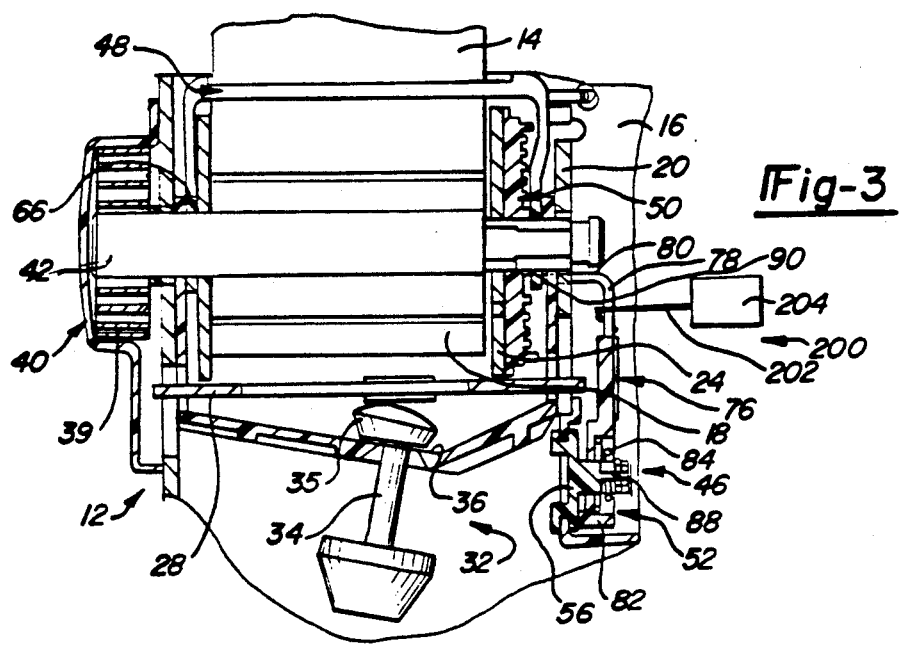
FIG. 3 is a vertical cross-sectional view of FIG. 2.

With particular reference now to FIGS. 2 and 3, retractor assembly 12 is shown to include retractor frame 16, to which a spool type belt retractor apparatus generally indicated at 18 is rotatably mounted. More particularly, retractor frame 16 includes a pair of laterally spaced side plates 20 and 22 which support spool 18 for rotation therebetween. The opposite ends of spool 18 include toothed sprockets 24 and 26 which are provided for interacting with an inertial locking mechanism 32 that is operably associated with retractor 12. A locking bar 28 is supported within socket 30 for pivotable movement between a first position disengaged from the teeth of sprockets 24 and 26 for permitting withdrawal of belt 14 and a second position engaged with sprockets 24 and 26 for inhibiting continued extension or withdrawal of belt 14 from retractor assembly 12.

In view of incorporation of inertial locking mechanism 32, retractor assembly 12 is classified as an "emergency locking retractor" (ELR) which functions to allow belt 14 to be readily spooled out for improved comfort and convenience during normal driving conditions and yet which will lock to inhibit withdrawal of belt 14 in response to the vehicle being exposed to a deceleration force above a predetermined level. As best seen in FIG. 3, an exemplary inertial locking mechanism 32 is shown to include an inertia pendulum 34 having an actuation head 35 which normally rests in socket 36 of pendulum support member 38. In the event of the vehicle experiencing a deceleration above a predetermined level, pendulum 34 pivots about actuation head 35 causing it to act on locking bar 28 for urging locking bar into its second position for lockingly engaging sprockets 24 and 26. It will be appreciated that inertia locking mechanism 32 is merely exemplary in nature and that retractor assembly 12 can be equipped with any suitable emergency locking device known in the art.

A rewind spring 39 housed within spring assembly 40 acts upon spool support shaft 42 to rotatably bias spool 18 such that a retracting force is generated upon withdrawal of belt 14 from retractor assembly 12. One end of belt 14 is attached to spool 18 and becomes rolled thereon as spool 18 is rotated by spring assembly 40.

Retractor assembly 12 further includes a so-called "comfort" mechanism 46 which is selectively operable for relieving the tension retracting force exerted on belt 14 by rewind spring 39 for enhancing occupant comfort and convenience. Comfort mechanism 46 is shown to be associated with retractor frame side plate 20 and principally includes a driven member or comfort cam 50 and a follower or comfort pawl assembly 52. Comfort cam 50 and comfort pawl assembly 52 shown associated with comfort mechanism 46 are generally equivalent to that described by U.S. Pat. Nos. 4,002,311 and 4,856,728, issued to the assignee of this application and which are hereby incorporated by reference. It is to be understood that the present invention is not to be limited to the particular structure shown of comfort mechanism 46 since other "comfort" mechanisms known in the retractor art can be readily substituted therefor.

Comfort cam 50 is shown secured for rotation to an outer face surface of sprocket 24. As such, comfort cam 50 is adapted to rotate with spool 18. The peripheral edge of comfort cam 50 is provided with "shadow" teeth 54 which assist in reducing the audible clashing of sprocket 24 with locking bar 28 upon actuation of inertia locking mechanism 32. Comfort pawl assembly 52 is shown to be supported and enclosed in a housing 56 attached to side plate 20 and a rearward surface of frame 16.

According to the principles of the present invention, an actuation member, hereinafter referred to as shutter 48, is pivotally supported intermediate the driven member and the follower of comfort mechanism 46 and is adapted to inhibit actuation of comfort mechanism 46 until a deliberate motion is exerted on belt webbing 14 that is different than belt movements associated with normal retractor operation. More particularly, shutter 48 is pivotally supported between comfort cam 50 and comfort pawl assembly 52. As will be described hereinafter in greater detail, utilization of shutter 48 in retractor assembly 12 promotes improved control of the method for "actuation" of comfort mechanism 46.

Shutter 48 is generally a U-shaped member having a central leg 58 defining an elongated aperture 60 through which belt 14 extends. Shutter 48 has a pair of downturned legs 62 and 64 that are aligned between sprockets 24 and 26, respectively, and side plates 20 and 22, respectively. In particular, downturned legs 62 and 64 have an aligned bore 66 through which support shaft 42 extends and about which shutter 48 is pivotably supported. Means for biasing shutter 48 in a first direction include a spring member 68 secured between a post 70 formed on shutter 48 and a portion of frame 14. Spring member 68 is provided for normally biasing shutter 48 rearwardly toward retractor frame 16 until a second shutter post 72 engages an upper surface of side plate 20. In addition, side plate 20 defines a generally arcuate slot 74, shown partially cut-away (FIG. 2), through which a stylus 76 of comfort pawl assembly 52 extends.

As best seen from FIGS. 2 through 7, stylus 76 includes a radially projecting arm 78 and a bent over stylus tip 80. Comfort pawl assembly 52 further includes a spring housing 82 from which arm 78 extends and a conical torsion spring 84. Spring housing 82 has an aperture 86 through which a pivot post 88 formed on housing 56 extends. The opposite ends of torsion spring 84 are operably connected to pivot post 88 and spring housing 82 for normally biasing stylus 76 in an inward direction with respect to spool 18 and comfort cam 50 for urging the terminal end of stylus tip 80 into sliding engagement with the tracks of comfort cam 50 upon "actuation" of comfort mechanism 46. However, prior to "actuation" of comfort mechanism 46, the terminal end of stylus tip 80 is normally biased by torsion spring 84 into engagement with an outer planar surface extension 90 of shutter 48 as is best shown in FIG. 4. In this "neutral" position, tip 80 of stylus 76 is inhibited from interacting with the tracts of comfort cam 50. As such, comfort mechanism 46 is in a "non-actuated" mode such that tension relief of belt 14 is prohibited. Therefore, during normal retractor operating conditions, as shown in FIG. 4, belt 14 can be retracted and withdrawn through aperture 60 without pivoting shutter 48 to the "actuated" mode position of FIG. 5.

As previously stated, shutter 48 is designed to require an "intentional" and "deliberate" input or act on the part of the vehicle occupant for actuating the tension relief feature of comfort mechanism 46. With reference to FIG. 5, a method of applying the intentional and deliberate act required for actuating comfort mechanism 46 is shown. In particular, following conventional fastening of belt 14 to a seat buckle (not shown), belt 14 is extracted from spool 18 to its full length of travel. Following complete withdrawal of belt 14 from spool 18, the seat occupant is required to impart or exert a deliberate motion, such as a firm "tug", on belt 14. The firm "tug" on belt 14 generates an inertial force which rotates spool 18 to an overcenter position such that belt 14 acts on shutter 48 to forcibly pivot shutter 48 in a second direction in opposition to the biasing of spring member 68.

Figure 8A:
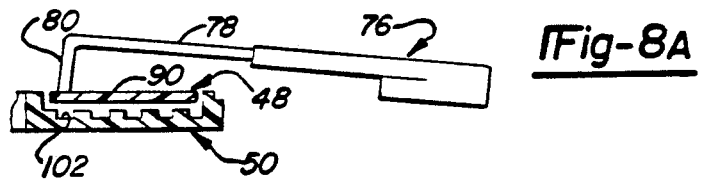
FIGS. 8A and 8B schematically illustrate the relative positioning of the various components of the improved comfort mechanism in the "non-actuated" and "actuated" mode positions, respectively.
Figure 8B:
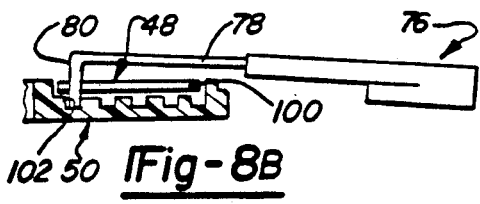

In essence, shutter 48 functions to sense a deliberate motion (i.e., the "tug") exerted on belt 14 that is different than naturally occurring belt motions and to "actuate" comfort mechanism 46 in response thereto. More specifically, the pivotal movement of shutter 48 in the second direction acts to disengage stylus tip 80 from planar shutter surface 90 such that torsion spring 84 biases stylus tip 80 into engagement with the tracks of comfort cam 50. Thereafter, the biasing of spring member 68 causes shutter 48 to pivot in the first direction toward stylus 76 such that upon subsequent release of belt 14 for retraction of belt 14 onto spool 18, a transverse edge surface 100 of shutter 48 engages bent-over tip 80 as it moves radially with the tracks. Therefore, upon pivotable movement of shutter 48 in the second direction, comfort mechanism 46 is placed in its "actuated" mode such that tension relief of belt 14 is permitted. FIGS. 8A and 8B illustrate the relative positioning of stylus 76 and shutter 48 relative to comfort cam 50 in the normally "non-actuated" and deliberately "actuated" positions, respectively.

Figure 9:
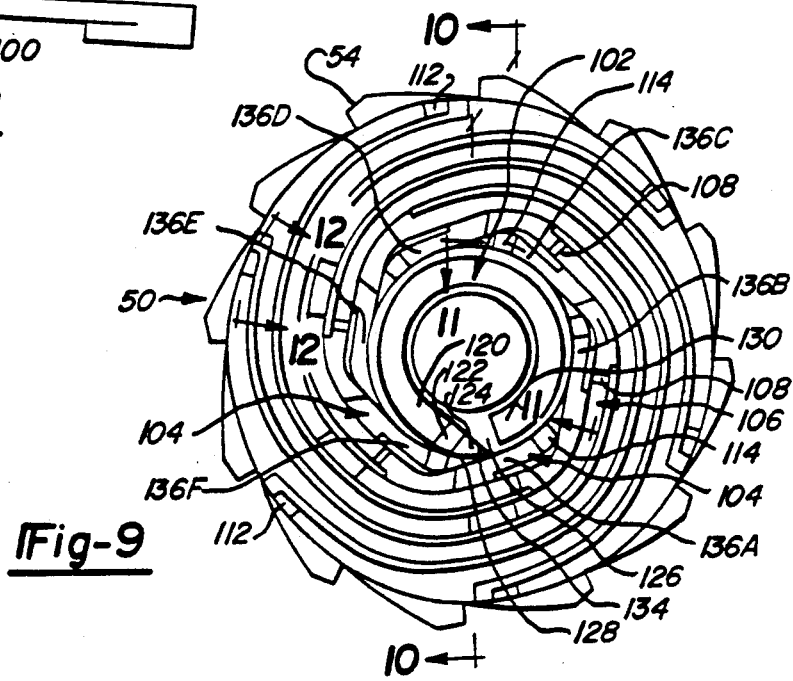
FIG. 9 is an enlarged plan view of an exemplary comfort cam associated with the improved comfort mechanism of the present invention.
Figure 6:
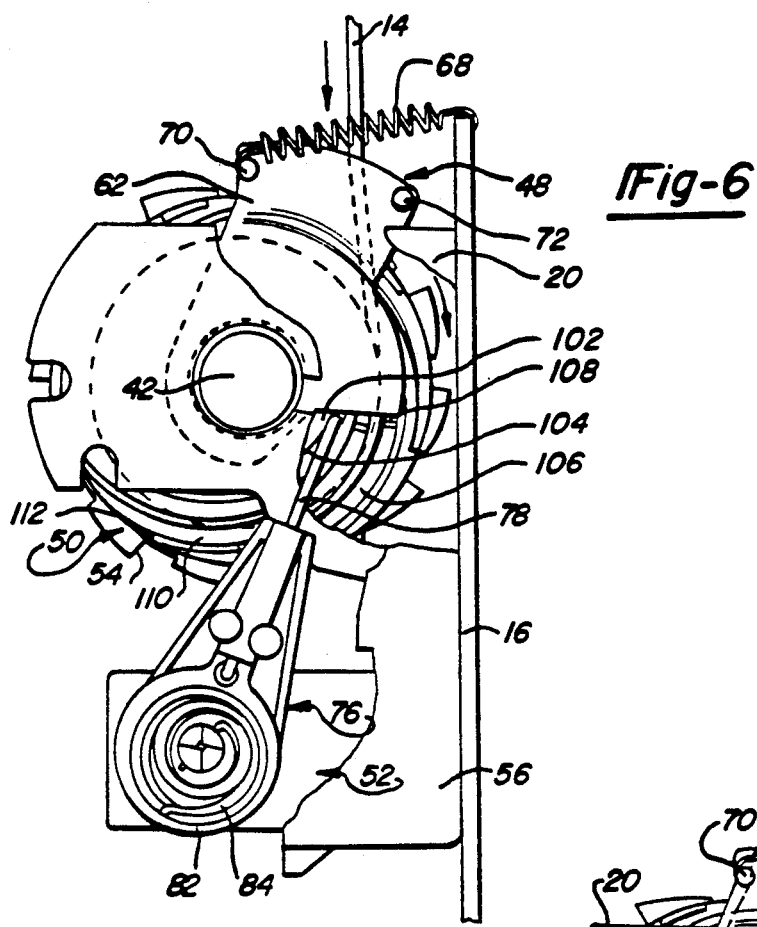

Since the general configuration and operation of comfort pawl assembly 52 relative to the tracks formed on comfort cam 50 is explained in detail with reference to U.S. Pat. No. 4,002,311, only a generalized description of a method of operation for comfort mechanism 46 as it relates to the present invention is provided. Following deliberate "actuation" of comfort mechanism 46 in the manner herebefore detailed, stylus tip 80 is biased into and adapted for slidingly engaging various tracks of comfort cam 50. As seen from FIG. 5, stylus tip 80 initially enters a center or "idle" track 102 upon actuation of comfort mechanism 46. From FIG. 6 it can be seen that upon initial retraction of belt 14 from its fully extended position, stylus tip 80 immediately exits idle track 102 and enter a control track 104. During continued retraction of belt 14 onto spool 18, stylus tip 80 remains within control track 104 until belt 14 assumes an initial confining or "taut" position against the occupant in the form of belt tension force applied by rewind spring 39. An audible clicking sound can be heard a stylus tip 80 steps over a plurality of spaced control ramps 114 (see FIG. 9) formed on control track 104 during such belt retraction. The audible clicking is an indication that comfort mechanism 46 has been actuated.

Figure 7:
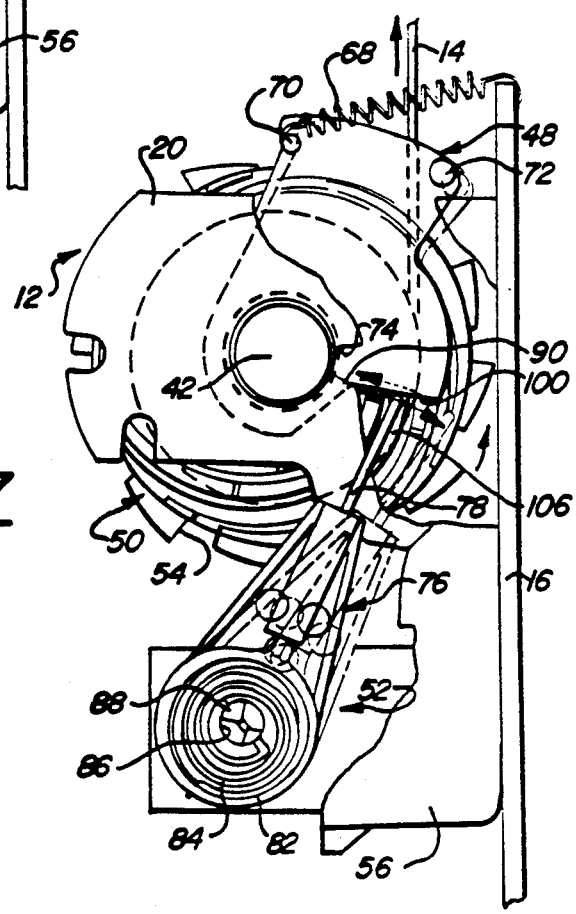
Figure 10:
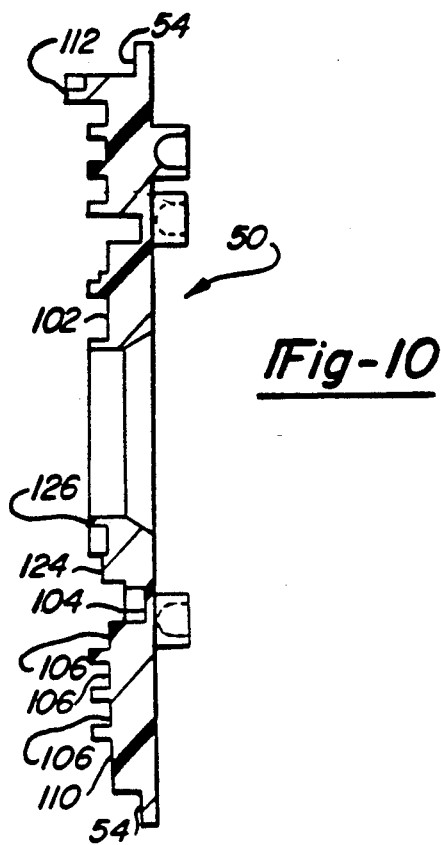
FIG. 10 is a cross-sectional view taken substantially along line 10—10 of FIG. 9.
Figure 11:
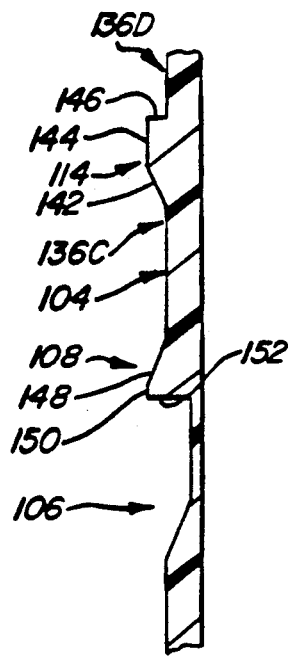
FIG. 11 is an enlarged cross-sectional view taken substantially along line 11—11 of FIG. 9.
Figure 12:
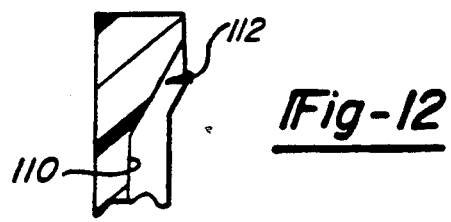
FIG. 12 is an enlarged cross-sectional view taken substantially along line 12—12 of FIG. 9.

As best seen in FIG. 7, withdrawal of a preselected length of belt 14 by the seat occupant following normal retraction (i.e., such as by leaning forward) functions to "set" a preselected amount of slack for relieving the belt tension. The amount of permissible slack can be varied according to different vehicle applications but is preferably less than about one inch. More particularly, such limited extension of belt 14 from spool 18 causes stylus tip 80 to move from control track 104 into one of a plurality of radially spaced locking tracks 106, each of which communicate with control track 104, and over a locking ramp 108. Locking ramps 108 inhibit retraction of belt 14 onto spool 18, thus relieving belt tension and setting spool 18 at a desired comfort position. Moreover, comfort mechanism 46 has a memory feature such that any subsequent withdrawal of less than a predetermined maximum length of belt 14 will return belt 14 to the "set" slack position.

Comfort mechanism 46 is also designed to permit manual cancellation of the tension relief ("slack") upon withdrawal of a length of belt 14 exceeding the predetermined maximum. As such, comfort mechanism 46 is returned to its "non-actuated" mode such that retractor assembly 12 returns to a normal operational mode wherein belt 14 is "taut" against the occupant and stylus 76 is in the disengaged position of FIG. 4. At the radially outward end of each locking track 106, an exit track section 110 and an exit ramp 112 are provided. Upon withdrawal of a length of belt 14 exceeding the predetermined maximum, stylus tip 80 rides over exit ramp 112 on exit track section 110 such that stylus tip 80 is axially positioned above the outermost axial surface of comfort cam 50 and planar surface 90 of shutter 48. Thereafter, torsion spring 84 acts to bias stylus 76 to ride over planar surface 90 of shutter 48 to return comfort mechanism 46 to its "non-actuated" condition. Concurrently, spring member 68 pivotably urges shutter 48 in the first direction until post 72 abuttingly rests on side plate 20.

Referring now to FIGS. 9 through 12, an exemplary construction for comfort cam 50 which is adapted for use in comfort mechanism 46 is illustrated in greater detail. However, it is to be understood that the specific configuration and arrangement of the various tracks associated with comfort cam 50 is exemplary in nature and may be readily modified to fulfill the requirements of various vehicular applications. In addition, the terms "clockwise" and "counter-clockwise" will be used for descriptive purposes only.

In general, comfort cam 50 is shown to include idle track 102 which is generally circuitous in form and is substantially concentric with the center of comfort cam 50 except for an end indicated at 120 which is adapted to provide unidirectional communication with control track 104. End 120 of idle track 102 is formed with an escape ramp 122 which terminates in a flat 124 aligned below planar surface 126 of comfort cam 50. Flat 124 communicates with control track 104 via a stop wall 128 formed at the juncture therebetween which inhibits stylus tip 80 from re-entering idle track 102 upon entering control track 104. Furthermore, a ramp 130 is formed at the opposite end of idle track 102, the upper portion thereof terminating at planar surface 126 of comfort cam 50. Planar surface 126 terminates at end 120 of idle track 102 and is separated therefrom by stop wall 134.

Control track 104 is shown to include six sections 136A through 136F. Each section 136 unidirectionally communicates with the others upon clockwise rotation (i.e., retraction of belt 14) of comfort cam 50 by means of control ramps 114 formed on one end thereof and having ramp surfaces 142 and flats 144 terminating in stop shoulders 146. The opposite end of each section 136 is adapted to communicate with one of a plurality of six locking tracks 106. As such, the radially spaced plurality of sections 136 associated with control track 104 permit tension relief of belt 14 at any rotational position of spool 18 and, in turn, comfort cam 50. Each Locking track 106 includes a locking ramp 108 having an upwardly extending ramp surface 148, a flat 150 and a stop shoulder 152. Locking tracks 106 are recessed forward of stop shoulder 152 to assist in inhibiting stylus tip 80 from re-entering control track 104 following entry into a locking track 106. In addition, locking tracks 106 are generally arranged in the form of a spiral such that each terminates at the outer periphery of comfort cam 50 with exit ramp 112 which, as noted, is provided for positioning stylus tip 80 above planar surface 126 of comfort cam 50 and radially outward of planar surface 90 of shutter 48.

With comfort mechanism in the "non-actuated" mode shown in FIG. 4, the withdrawal of belt 14 from spool 18 causes comfort cam 50 to rotate in a counter-clockwise direction. During such rotation, stylus tip 80 rests on planar surface 90 of shutter 48 until comfort mechanism 46 is deliberately "actuated". As such, stylus 76 remains disengaged from the tracks of comfort cam 50 during normal operation of retractor assembly 12. Following deliberate "actuation" of comfort mechanism 46, comfort cam 50 rotates in a clockwise direction for retracting belt 14 to a "taut" position relative to the chest of the seat occupant. Initially, such retraction causes stylus tip 80 to move from idle track 102 over escape ramp 122, flat 124, and drop into track section 136A of control track 104 ahead of stop wall 128. Thus, stylus tip 80 is prevented from returning into idle track 102. Thereafter, continued retraction of belt 14 to a snug position against the occupant causes stylus tip 80 to successively ride over control ramps 114, flats 142 and stop shoulders 144 of successive sections 136A through 136F such that stylus tip 80 will continue to circulate in control track 104 so long as belt 14 continues to retract onto spool 18.

Thereafter, withdrawal of a selected length of belt 14 by the occupant causes counter-clockwise rotation of comfort cam 50 thus causing stylus tip 80 to move over a locking ramp 108 and past a stop shoulder 152 associated with one of locking tracks 106. Therefore, when the occupant releases belt 14, a slight amount of retraction may occur until stylus tip 80 is lockingly abuts stop shoulder 152 for inhibiting any further retraction of belt 14. In this manner, a predetermined amount of "slack" has been intentionally introduced into belt 14 to enhance the comfort of the seat occupant. As noted, comfort mechanism 46 may be cancelled by the occupant thereafter withdrawing more than a predetermined maximum length of belt 14 such that comfort cam 50 rotates in a counter-clockwise direction until stylus tip 80 rides over exit ramp 112 to snap back radially inwardly over shutter 48 to its initial "neutral" position.

Furthermore, a release mechanism is provided to assure automatic cancellation of the tension relief feature in any position of stylus tip 80 within tracks 106 without manipulation of belt 14 when the seat belt is unlatched. This release mechanism 200 is diagrammatically illustrated (FIG. 3) as including a release member 202 engaging stylus 76 and a control device 204 adapted for selectively moving release member 202 from a first position allowing stylus 76 to engage cam 50 to a second position for displacing stylus 76 from cam 50. Incorporated U.S. Pat. No. 4,002,311 describes an exemplary device for lifting or disengaging stylus 76 from whichever of the tracks it may be disposed in and allowing stylus 76 to snap back to its initial "non-actuated" neutral position.

Figure 13:
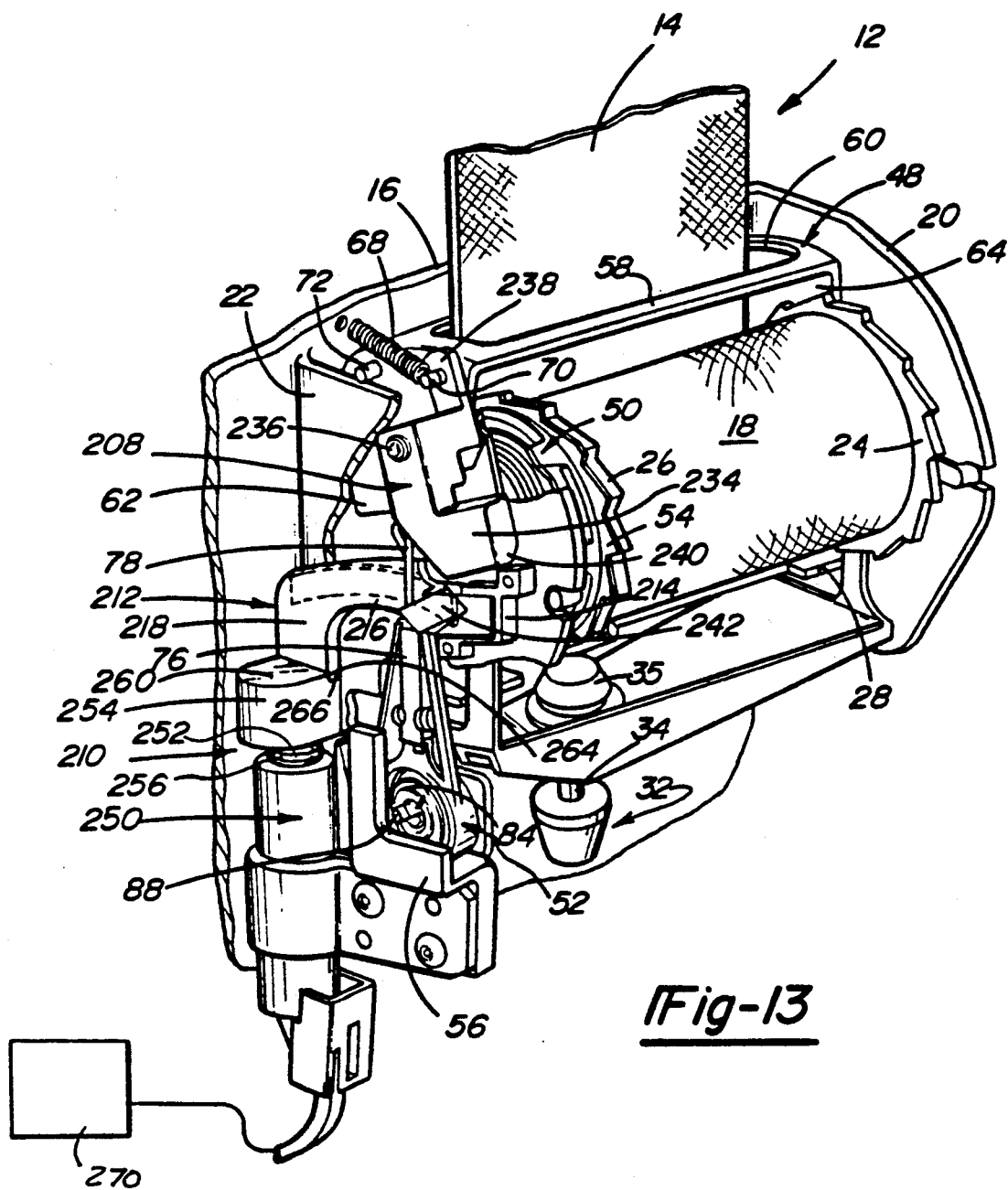
FIG. 13 is a partially cut-away pictorial view of an exemplary retractor assembly equipped with an improved comfort mechanism constructed in accordance with an alternative preferred embodiment of the present invention.

With particular reference now to FIG. 13, a preferred construction for a release mechanism is shown in greater detail. In general, FIG. 13 illustrates retractor assembly 12 equipped with a modified comfort mechanism 208 which is associated with a release mechanism 210 for automatically cancelling the tension relief feature in response to the occurrence of certain specific vehicular conditions. For example, release mechanism 210 is operable for automatically cancelling the tension relief (i.e., returning comfort mechanism 208 to its "non-actuated" mode) in response to a signal indicating that the vehicle door has been opened. Likewise, signals generated in response to heavy braking conditions (i.e., via a brake sensor or deceleration sensor) or unbuckling of belt webbing 14 from a seat buckle may also be used for actuating release mechanism 210. In general, comfort mechanism 208 is similar to comfort mechanism 46 in that they both require a conscious "intentional" and "deliberate" act on the part of the seat occupant for actuating the tension relief feature. Due to the commonality of components, like reference numbers are used hereinafter to designate identical or substantially similar components previously described in reference to retractor assembly 12 and comfort mechanism 46.

Figure 14:
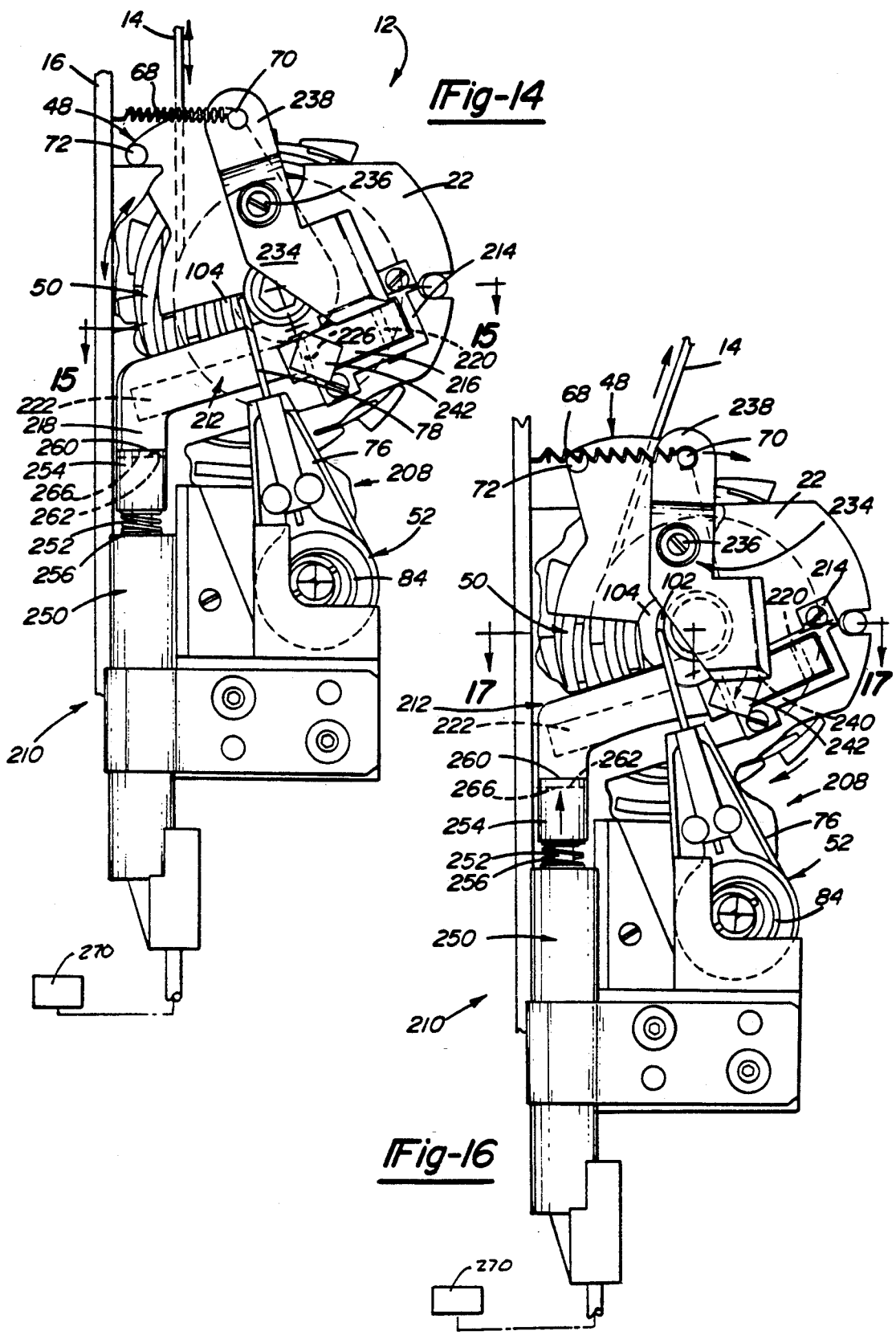
FIG. 14 is a partially cut-away side view of the retractor assembly shown in FIG. 13 with the comfort mechanism in the "non-actuated" mode.
Figure 15:
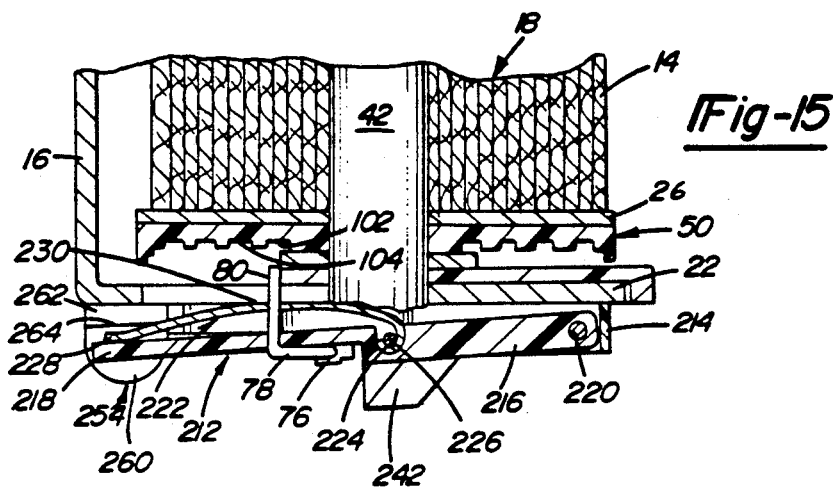
FIG. 15 is a partial cross-sectional view taken along line 15—15 of FIG. 14.
Figure 17:
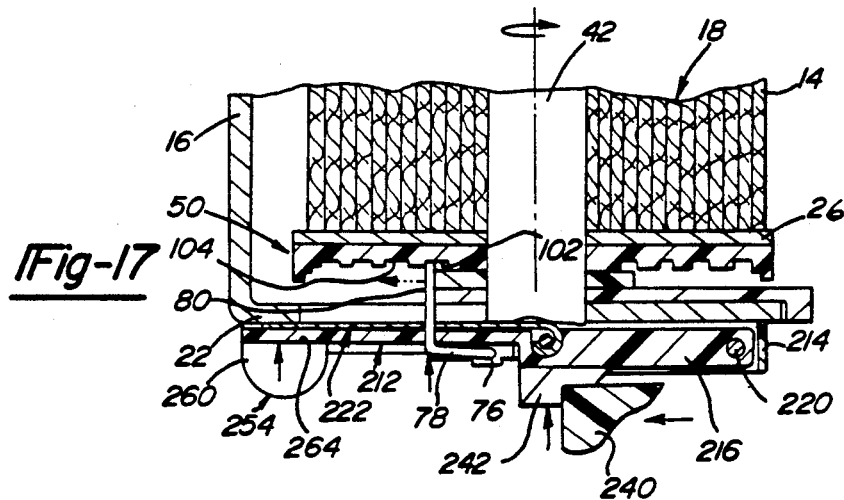
FIG. 17 is a partial cross-sectional view taken along line 17—17 of FIG. 16.

With particular reference to FIGS. 13 through 19, the operative arrangement of comfort mechanism 208 and release mechanism 210 will now be described. In addition to comfort cam 50, pawl assembly 52 and shutter 48, comfort mechanism 208 is shown to include a "pawl and cam" actuation arrangement that is mounted to side plate 22. More specifically, a generally L-shaped pawl member 212 is pivotably supported from a hinge housing 214 that is fixed to side plate 22. L-shaped pawl 212 has an elongated first leg 216 and a down-turned second leg 218. The terminal end of first pawl leg 216 is pinned via hinge pin 220 to hinge housing 214 for pivotable movement relative to side plate 22. As best seen in FIGS. 15 and 17, a cambered leaf spring 222 is provided for normally biasing pawl member 212 away from side plate 22. Leaf spring 222 has a first end 224 fixed to first pawl leg 216 via pin 226, a second end 228 acting on down-turned second pawl leg 218, and an intermediate cambered portion 230 acting directly on side plate 22 for normally urging pawl member 212 to the position shown in FIG. 15. As will be described hereinafter in greater detail, FIG. 15 illustrates comfort mechanism 208 in its "non-actuated" mode wherein pawl member 212 forcibly acts on stylus 76 in opposition to the biasing of torsion spring 84 for maintaining stylus 76 and, in turn, stylus tip 80 in a position of disengagement from idle track 102 of comfort cam 50. Similarly, FIG. 17 illustrates comfort mechanism 208 in its "actuated" mode wherein a deliberate act by the seat occupant causes pawl member 212 to move toward side plate 22, in opposition to the biasing of leaf spring 222, for permitting stylus tip 80 to engage the tracks of comfort cam 50.

The pawl and cam actuation arrangement of comfort mechanism 208 further includes a cam member 234 supported for pivotable movement on side plate 22 about pivot post 236. Cam member 234 includes an upstanding flange 238 having an aperture through which shutter post 70 projects. In this manner, cam member 234 is pivotably movable in response to concurrent pivotable movement of shutter 48. Moreover, spring member 68 tends to concurrently urge shutter 48 and cam member 234 in the first direction toward retractor frame 16 as best seen in FIGS. 13 and 14. The opposite end of cam member 234 is formed to include a tapered or "ramped" camming edge 240 which is adapted to act on a tapered cam block 242 formed on first pawl leg 216 in response to the seat occupant deliberately and intentionally actuating comfort mechanism 208 in a manner substantially identical to that previously described for comfort mechanism 46. More specifically, following complete withdrawal of belt 14 from spool 18, a deliberate "snap" or "tug" on belt 14 causes shutter 48 to move in the second direction against the urging of spring 68 which, in turn, causes concurrent pivotable movement of cam member 234 about pivot 236. As such, cam edge 240 "rides" over pawl cam block 242 for forcibly displacing pawl member 212 to the "actuated" position shown in FIGS. 16 and 17. As will be hereinafter described, means are provided for lockingly retaining pawl member 212 in the inwardly displaced position (FIG. 17) during "actuated" operation of comfort mechanism 208 when tension relief is desired. Furthermore, the biasing of torsion spring 84 causes stylus 76 to move substantially concurrently with pawl member 212 toward side plate 22, whereby stylus tip 80 is permitted to slidably engage the tracks of comfort cam 50.

As best seen from FIG. 13, release mechanism 210 is operably associated with the pawl and cam actuation arrangement of comfort mechanism 208 for automatically cancelling the tension relief feature under certain specified conditions. Release mechanism 210 includes a solenoid assembly 250 having an armature post 252 that is axially movable in response to selective energization of solenoid assembly 250. A spring-loaded blocking cap 254 is mounted on the terminal end of armature post 252 such that compression spring 256 is slightly pre-loaded for normally urging blocking cap 254 in an upward direction. Blocking cap 254 is configured to include a stepped locking shoulder having an upper planar surface 260, a lower planar surface 262 and a generally vertically extending surface 264 therebetween. When comfort mechanism 208 is in its "non-actuated" mode, a bottom edge surface 266 of second pawl leg 218 rests on upper planar surface 260 as shown in FIGS. 14 and 15. This arrangement tends to cause further compression of spring 256. Likewise, when comfort mechanism 208 is "actuated", movement of pawl member 212 toward side plate 22 causes bottom edge 266 to be releasably trapped within the stepped shoulder portion of blocking cap 254 as is shown in FIGS. 16 and 17. Therefore, the biasing of compression spring 256 acts to maintain the locked engagement of second pawl leg 218 against shoulder surface 264 in opposition to the biasing force exerted thereon by leaf spring 222.

With specific reference now to FIGS. 14 through 19, a preferred method of operating comfort mechanism 208 will now be described in greater detail. FIGS. 14 and 15 depict comfort mechanism 208 in its "non-actuated" mode wherein tip 80 of stylus 76 is inhibited from interacting with the track of comfort cam 50 such that tension relief of belt 14 is prohibited. Therefore, during normal retractor operating conditions, belt 14 can be retracted and withdrawn through aperture 60 without pivoting shutter 48 or cam member 234. More particularly, the biasing force of leaf spring 222 is greater than the biasing force exerted by torsion spring 84 such that pawl member 212 and, in turn, stylus 76 are biased away from side plate 22 such that stylus tip 80 is maintained in a position displaced from comfort cam 50. In this position, bottom edge 266 of second pawl leg 218 restingly engages upper surface 260 of blocking cap 254 due to the slight pre-load exerted by compression spring 256.

As noted, comfort mechanism 208 is designed to require an "intentional" and "deliberate" input or act on the part of the vehicle occupant for actuating the tension relief feature. With reference to FIGS. 16 through 18, a preferred method of applying the intentional and deliberate act required for placing comfort mechanism 208 in its "actuated" mode is shown. Following conventional fastening of belt 14 to a seat buckle (not shown), belt 14 is fully extracted from spool 18. Thereafter, the seat occupant must impart or exert a deliberate motion, such as a firm "tug" or "snap" on belt 14. This deliberate motion generates an inertial force which rotates spool 18 to an over-center position such that belt 14 acts directly on shutter 48 for forcibly pivoting shutter 48 in the second direction in opposition to the biasing of spring member 68. Such movement of shutter 48 causes concurrent pivotable displacement of cam member 234 wherein camming edge 240 rides over pawl cam block 242 for pivoting pawl member 212 inwardly toward side plate 22 until bottom edge 266 is lockingly retained within the stepped shoulder portion of blocking cap 254. This arrangement is shown in FIGS. 13 and 17 for clearly illustrating the engagement of stylus tip 80 with the tracks of comfort cam 50 while spring-loaded blocking cap 254 acts to physically restrain pawl member 212. As before, stylus tip 80 is biased by torsion spring 84 into alignment with center or idle track 102 for initial engagement therewith.

As seen from FIG. 18, following initial retraction of belt 14 from its fully extended position, stylus tip 80 immediately exits idle track 102 and enters control track 104 where it circulates until belt 14 assumes an initial confining or "taut" position against the occupant in the form of belt tension as applied by rewind spring 39. Thereafter, withdrawal of a preselected length of belt 14 by the seat occupant causes stylus tip 80 to enter a locking track 106 and ride over locking ramp 108 for intentionally "setting" a preselected amount of "slack".

If desired, belt webbing 14 can be returned to a "taut" position upon the seat occupant withdrawing a greater length of belt than the predetermined maximum. However, comfort mechanism 208 is not returned to its "non-actuated" mode upon such manual cancellation of the tension relief feature since pawl member 212 remains releasably locked by blocking cap 254 until solenoid assembly 250 is actuated. As such, once stylus tip 80 rides over exit ramp 112, torsion spring 84 biases stylus 76 to "snap-back" (i.e., slide along pawl 212) into alignment with center track 102. Subsequent retraction to the "taut" position is accomplished upon stylus tip 80 circulating in control track 104 in the manner disclosed. However, it is contemplated that means may be provided to actuate solenoid assembly 250 in response to manual cancellation of the tension relief feature such that comfort mechanism would return to the non-actuated mode position shown in FIG. 15.

With particular reference now to FIG. 19, an apparatus and method for automatically cancelling the tension relief feature in response to the occurrence of certain specific conditions is shown. In general, the windings (not shown) of solenoid assembly 250 are selectively energized in response to an electrical signal generated by a switch or sensor device generally identified herein as reference numeral 270. More particularly, upon energization of the windings of solenoid assembly 250, armature post 252 is axially withdrawn into solenoid assembly 250 such that blocking cap 254 is downwardly displaced concurrently therewith in opposition to the biasing of spring 256. As such, bottom edge surface 266 of second pawl leg 218 is released from the shoulder portion of blocking cap 254 such that leaf spring 222 is permitted to urge pawl member 212 and stylus 76 outwardly away from side plate 22 and comfort cam 50 for placing comfort mechanism 208 in its "non-actuated" mode. Moreover, torsion spring 84 of pawl assembly 52 is adapted to return stylus 76 into alignment with center idle track 102 following such automatic cancellation of the comfort feature in preparation for any subsequent actuation of comfort mechanism 208. Therefore, upon such automatic cancellation of the tension relief feature the predetermined amount of slack introduced into belt 14 is retracted onto spool 18 via return spring 39. While switch 270 will most commonly be associated with a door switch for signalling opening of the vehicle door, it is to be understood that any means for generating a signal in response to detection of the occurrence of some condition requiring cancellation of the comfort feature is within the realm of this invention. While switch 270 is generically shown, it is to be understood that selective actuation of solenoid assembly 250 could also be controlled via an electronic control unit or the like.

While the above description constitutes the preferred embodiments of the present invention, it will be appreciated that the invention is acceptable to modification, variation and change so as to be incorporated into most conventional comfort mechanisms without departing from the proper scope and fair meaning of the accompanying claims.

What is claimed is:

1. A safety belt retractor comprising:
   a rotatable spool for storing safety belt webbing thereon;
   first biasing means for biasing said spool to exert a retraction force on said belt webbing;
   comfort means for relieving tension exerted on said belt webbing by said first biasing means, said comfort means having a first member fixed for rotation with said spool and a second member movable with respect to said first member, said comfort means having a non-actuated mode wherein said second member is displaced from said first member for permitting said first biasing means to exert said retraction force on said belt webbing, and said comfort means having an actuated mode wherein said second member engages said first member for relieving tension exerted on said belt webbing by said first biasing means;
   an actuation mechanism disposed between said first and second members and operable for shifting said comfort means into said actuated mode in response to a seat occupant imparting a deliberate protractive movement on said belt webbing following substantially complete withdrawal thereof, said actuation mechanism including a pawl member acting on said second member, camming means for moving said pawl member between a first position in response to said deliberate protractive movement for permitting said second member to engage said first member, and a second position wherein said second member is displaced from said first member;
   second biasing means for normally biasing said pawl member toward said second position;
   latching means for releasably retaining said pawl member in said first position when said comfort means is in said actuated mode;
   signal generating means for generating a signal indicative of the occurrence of a predetermined condition; and
   release means for releasing said pawl member from said latching means for movement to said second position in response to said signal.

2. The safety belt retractor of claim 1 wherein said first member of said comfort means is a cam plate having a plurality of tracks formed thereon and said second member is a follower operable for engaging said tracks when said pawl member is in said first position and being displaced therefrom when said pawl member is in said second position.

3. The safety belt retractor of claim 2 wherein said camming means comprises a cam member forcibly urging said pawl member from said second position to said first position in response to movement of said cam member upon said seat occupant imparting said deliberate protractive movement on said belt webbing.

4. The safety belt retractor of claim 3 further comprising a shutter operable for pivoting in a first direction in response to said belt webbing acting thereon during said deliberate protractive movement thereof, said cam member being fixed to said shutter for movement therewith, and third biasing means for normally biasing said shutter in a second direction for permitting said second biasing means to bias said pawl member to said second position.

5. The safety belt retractor of claim 2 wherein said release means is a solenoid assembly having a movable armature, said latching means being coupled to said armature for movement therewith such that energization of said solenoid assembly in response to said signal causes concurrent movement of said armature and said latching means for releasing said pawl member, whereby said second biasing means urges said pawl member toward said second position.

6. The safety belt retractor of claim 5 wherein said signal generating means is a sensor operable for detecting said seat occupant unbuckling said belt webbing and generating an electrical signal in response thereto for energizing said solenoid assembly.

7. The safety belt retractor of claim 5 wherein said signal generating means is an electrical switch operable for detecting said seat occupant opening a door of the vehicle and generating an electrical signal in response thereto for energizing said solenoid assembly.

8. A tension relief apparatus for use with a safety belt retractor of the type having a rotatable spool for storing safety belt webbing and a rewind spring for exerting a retraction force on the belt webbing, said tension relief apparatus comprising:

a first member rotatable with the spool;

a second member movable between a first position displaced from said first member for permitting the rewind spring to exert the retraction force on the belt webbing and a second position engaging said first member for relieving tension exerted on the belt webbing by the rewind spring;

first biasing means for normally biasing said second member toward said second position;

a pawl member acting on said second member for causing movement of said second member between said first and second positions;

camming means for moving said pawl member from a third position with said second member in said first position to a fourth position for moving said second member to said second position in response to a deliberate protractive movement being imparted on the belt webbing by a vehicle operator following substantially complete withdrawal of the belt webbing from the spool;

second biasing means for normally biasing said pawl member toward said third position;

latching means for releasably retaining said pawl member in said fourth position when said comfort means is in said actuated mode;

signal generating means for generating a signal indicative of the occurrence of a predetermined condition; and release means for releasing said pawl member from said latching means for causing said second biasing means to forcibly urge said pawl toward said third position in response to said signal.

9. The tension relief apparatus of claim 8 wherein said first member is a comfort cam having a plurality of tracks formed on a face surface thereof, and said second member is a stylus having a tip adapted to engage said tracks of said comfort cam when said pawl member is retained in said fourth position by said latching means.

10. The tension relief apparatus of claim 9 wherein said camming means comprises a cam member forcibly urging said pawl member from said third position to said fourth position in response to movement of said cam member caused by said seat occupant imparting said deliberate protractive movement on said belt webbing.

11. The tension relief apparatus of claim 10 further comprising a shutter operable for pivoting in a first direction in response to said belt webbing acting thereon during said deliberate protractive movement thereof, said cam member being fixed to said shutter for movement therewith, and third biasing means for normally biasing said shutter in a second direction.

12. The tension relief apparatus of claim 11 wherein said release means is a solenoid assembly having a movable armature, said latching means being coupled to said armature for movement therewith such that energization of said solenoid assembly in response to said signal causes concurrent movement of said armature and said latching means for releasing said pawl member, whereby said second biasing means urges said pawl member toward said third position.

13. The tension relief apparatus of claim 12 wherein said signal generating means is a sensor operable for detecting said seat occupant unbuckling said belt webbing and generating an electrical signal in response thereto for energizing said solenoid assembly.

14. The tension relief apparatus of claim 12 wherein said signal generating means is an electrical switch operable for detecting said seat occupant opening a door of the vehicle and generating an electrical signal in response thereto for energizing said solenoid assembly.

15. A safety belt retractor comprising:

a frame for mounting to a motor vehicle structure;

a spool secured for rotation on said frame and operable for storing safety belt webbing thereon;

a rewind spring exerting torsional loading on said spool for exerting a retraction force on said belt webbing;

a comfort mechanism having a non-actuated mode for permitting said rewind spring to exert said retraction force on said belt webbing and an actuated mode for relieving said retraction force, said comfort mechanism including a first member rotatable with said spool and a second member supported on said frame for movement between a first position disengaged from said first member when said comfort mechanism is in said non-actuated mode and a second position engaged with said first member when said comfort mechanism is in said actuated mode;

actuating means for retaining said second member in said first position for maintaining said comfort mechanism in said non-actuated mode until a deliberate and intentional protractive motion is exerted on said belt webbing following substantially complete withdrawal thereof from said spool that is different than movements associated with normal operation of said retractor, said actuating means including a third member acting on said second member and a fourth member that is selectively engageable with said third member for causing movement of said third member in a first direction for moving said second member from said first position to said second position;

biasing means for normally biasing said third member in a second direction for urging said second member toward said first position;

latching means acting on said third member for releasably retaining said second member in said second position when said comfort means is in said actuated mode;

signal generating means for generating a signal indicative of the occurrence of a predetermined condition; and release means for releasing said third member in response to said signal for movement via said biasing means in said second direction, whereby said second member is biasingly urged to said first position.

16. The safety belt retractor of claim 15 wherein said fourth member is a shutter having means for forcibly urging said third member in said first direction in response to said deliberate protractive motion so as to cause said second member to move to said second position.

17. The safety belt retractor of claim 16 wherein said release means is a solenoid assembly having a movable armature, and said latching means is coupled to said armature for movement therewith such that energization of said solenoid assembly in response to said signal causes concurrent movement of said armature and said latching means for releasing said third member, whereby said biasing means is permitted to urge said third member in said second direction for moving said second member to said first position.

18. The safety belt retractor of claim 17 wherein said signal generating means is a sensor operable for detecting said seat occupant unbuckling said belt webbing and generating an electrical signal in response thereto for energizing said solenoid assembly.

19. The safety belt retractor of claim 17 wherein said signal generating means is an electrical switch operable for detecting said seat occupant opening a door of the vehicle and generating an electrical signal in response thereto for energizing said solenoid assembly.

20. A method for automatically cancelling a comfort mechanism of a safety belt retractor following deliberate actuation thereof, said method comprising the steps of:

providing a safety belt retractor having a rotatable spool for storing safety belt webbing, rewind spring means for exerting a retraction force on said belt webbing, a comfort mechanism having a non-actuated mode provided for normally permitting said rewind spring means to exert said retraction force and an actuated mode provided for selectively releasing tension exerted on said belt webbing by said rewind spring means, actuation means for intentionally shifting said comfort mechanism from said non-actuated mode to said actuated mode, and release means for automatically shifting said comfort mechanism from said actuated mode to said non-actuated mode in response to occurrence of a predetermined condition;

withdrawing said belt webbing from said spool for fastening to a buckling device with said comfort mechanism in said non-actuated mode;

withdrawing said belt webbing until it is substantially withdrawn from said spool;

imparting a deliberate and intentional force on said belt webbing for causing said webbing to act on said actuation means for deliberately shifting said comfort mechanism from said non-actuated mode to said actuated mode;

detecting an occurrence of said predetermined condition and generating a signal in response thereto; and actuating said release means in response to said signal for shifting said comfort mechanism into said non-actuated mode.

* * * * *